UNITED STATES PATENT OFFICE.

WILLIAM SPEIRS SIMPSON AND HOWARD OVIATT, OF LONDON, ENGLAND.

METALLURGY OF IRON AND STEEL.

943,574.

Specification of Letters Patent.  Patented Dec. 14, 1909.

No Drawing.   Application filed March 19, 1909. Serial No. 484,540.

*To all whom it may concern:*

Be it known that we, WILLIAM SPEIRS SIMPSON and HOWARD OVIATT, a subject of the King of Great Britain and a citizen of the United States of America, respectively, both residing at 165 Victoria street, London, England, have invented certain new and useful Improvements in Connection with the Metallurgy of Iron and Steel, of which the following is a specification.

This invention has for its object the reduction of iron oxids and the production of metallic iron from various ores in which iron occurs as an oxid, or the production of steel directly from such ores at one operation.

The method or process is adaptable to any form of iron oxid capable of being crushed or ground for mixing purposes as hereinafter set forth, but it is peculiarly adapted to the treatment of concentrates or of ores already existing in a state of fine division as natural products, such as magnetic iron sands.

In carrying out the purposes of the invention we thoroughly mix any convenient quantity of suitable iron ore which if not already in a comparatively fine state of division has been so prepared, with an aqueous mixture sufficient in quantity to form a stiff paste suitable for being placed, as a furnace or crucible ore-charge, in a receptacle prepared for the purpose and which is then subjected to heat. This aqueous mixture is composed of water and a carbonaceous compound such as a suitably prepared sulfite woodpulp, straw pulp or other material in which cellulose $(C_6H_{10}O_5)_n$ predominates; hereinafter designated as a cellulose carbo-hydrate, sufficient in quantity to effect the desired result. It is advisable (but not always necessary) that the aqueous mixture should be made with hot water. The quantity of such cellulose carbo-hydrate required for the purpose of reducing the ore, or for the reduction thereof and its conversion into steel, varies according to the character of such reducing agent and the character of the ore under treatment. Thus if magnetic iron sand or crushed hematite ore or concentrates, represents the ore to be reduced, and if ordinary dry or nearly dry wood pulp such as is used for paper making represents the reducing agent to be employed, the quantity of such cellulose carbo-hydrate should be approximately equal to from four to six per cent. of the weight of the ore to be treated. The employment of an excess of such cellulose carbo-hydrate is not detrimental to the accomplishment of the desired result and in some cases if an excess thereof is employed the water may be omitted. But the omission of the water renders it necessary in some cases to employ a considerably larger quantity of wood pulp (cellulose) than would otherwise be sufficient for the purpose.

In almost every case unless already present in the crude ore there should also be intimately and thoroughly mixed with the ore-charge, sufficient finely ground lime, alumina, silica, or other convenient slagging or fluxing materials, in suitable proportions to form during the process of heating and reduction, a liquid slag, which may be rendered either acid or basic as may be best suited to the ore under treatment. With some ores, especially such as may contain objectionable impurities it is necessary for the production of a pure quality of iron, to add to the ore-charge a suitable quantity (rarely exceeding two per cent. of the weight of the ore) of manganese dioxid, finely ground and intimately mixed with the ore to be treated, which substance in some cases assists in the purification and improvement of the metallic iron. Instead of such manganese dioxid there may be introduced a suitable quantity of manganese ore containing the requisite proportion of dioxid.

If steel is to be produced directly from the ore, instead of iron, it is necessary besides the carbo-hydrate reducing agent to add to the ore-charge (*a*) a suitable quantity of finely ground manganese dioxid representing from two per cent. to six per cent. (or upward) of the weight of the ore, according to the character thereof and the quality of steel to be produced and (*b*) a suitable quantity of a carburizing material in finely divided form and intimately mixed with the ore-charge. Such carburizing material may consist of graphite (plumbago) or other suitable carbon, such as a pure form of ground coke, and may be employed in quantities adequate to carburize the steel to any desirable extent. Thus the employment of two per cent. of graphite is found to produce a steel containing 0.87% of combined carbon and the employment of 4% of graphite produces steel containing double that amount or about 1.95% of combined carbon. If pulverized coke is employed for carburization purposes a somewhat greater percentage is required to effect the same result. By this simple method any desired percentage of combined carbon may be introduced into the steel during the process of reducing the ore from which the same is made.

The ore-charge having been prepared in the manner hereinbefore described may be placed in any suitable receptacle or vessel (with or without a cover) and subjected to heat in any convenient manner or in any convenient form of furnace wherein it is practicable to create and maintain a heat equal to or somewhat higher than the melting point of steel. Or the prepared ore-charge may be packed into or suitably placed within the hearth of a furnace such as a Siemens' open hearth regenerative furnace, fired by gas. The hearth of such furnace should be provided with a suitable refractory lining preferably carbonaceous.

When subjected to a heat varying from 2,600° F. to 3,000° F. or upward, according to the result desired, for a period of time ranging from two hours to five hours and upward, according to the magnitude of the ore-charge, there may be produced either (1) a soft malleable pig or cast iron of remarkable purity in that it is practically free from graphitic carbon or silicon, or (2) a fine quality of spongy iron suitable for the manufacture of wrought iron bar, the result depending in the case of iron production chiefly upon the temperature to which the ore has been subjected during or after reduction and whether such temperature has been high enough to melt the reduced iron or otherwise. Or (3) instead of iron there may be produced a fine and uniform quality of steel, which may either have the character of mild steel, low in carbon, or of crucible or tool steel, high in carbon, the percentage of combined carbon contained therein being entirely at the command of the operator.

If it is required to produce steel containing various other metals desirable as alloys, a suitable mixture of ores containing the metals required in the desired proportions may be brought together in the ore charge and the requisite steel alloy will, in most cases result from the one operation.

In some cases either for the purposes of iron or steel production the action of the cellulose carbo-hydrate reducing agent may be augmented by the addition to the ore-charge of a small percentage of finely ground carbon such as coke or charcoal which may or may not be intimately mixed therewith. If the same be not intimately mixed with the ore it may be rendered plastic by association with water and a suitable carbo-hydrate and introduced into the receptacle or furnace hearth as a temporary lining thereto.

Although it is usually desirable that the ores to be treated should be in a fine state of division, the application of this process may not be limited thereto; but an ore-charge may be prepared in the manner hereinbefore indicated with ores in a state of division comparatively fine, such as ores which may not have been crushed to uniform fineness or may not have been screened after crushing, so that portions thereof may have been rendered as fine as sand and other portions may remain in quarter inch lumps or coarser.

Claims.

1. A process of producing iron and steel directly from iron ores which consists in intimately associating a cellulose carbo-hydrate with the ore, and heating the charge to effect its reduction.

2. A process of producing iron or steel directly from ore which involves mixing with the ore water and a cellulose carbo-hydrate reducing agent, and heating the charge to effect its reduction.

3. A process of producing iron or steel directly from ore which consists in mixing with the ore a cellulose carbo-hydrate associated with sufficient water to bring the same into intimate contact with the ore, and heating the charge thus prepared to effect its reduction.

4. A process of producing iron or steel directly from ore which consists in mixing with the ore a cellulose carbo-hydrate reducing agent in the form of a pulp associated with sufficient water to bring the same into intimate contact with the ore, and heating the charge thus prepared to effect its reduction.

5. The herein described art of producing iron or steel directly from ore which consists in intimately associating with the ore a carbonaceous substance consisting of a cellulose carbo-hydrate or a compound in which cellulose carbo-hydrates predominate, and heating the charge to effect its reduction.

6. A process of manufacturing steel directly from iron ores whereby the carburization thereof may be so effected and controlled that a uniform quality of steel containing any desired percentage of combined carbon may be produced, which consists in associating a suitable cellulose carbo-hydrate reducing agent and an effective carburizing carbon with the ore, and subjecting the charge thus prepared to heat to effect its reduction and carburization.

7. An improvement in the art of producing iron or steel directly from ores which consists in associating a suitable cellulose carbo-hydrate reducing agent with an adequate quantity of manganese dioxid to effect the reduction of such ores and the purification and improvement of the metal.

8. A process of reducing iron ores to metallic iron which consists in preparing an ore charge containing the ore in a comparatively fine state of division, an efficient cellulose carbo-hydrate reducing agent associated with sufficient water to bring the same into intimate contact with the particles of ore, a suitable quantity of finely divided dioxid of manganese thoroughly mixed with the ore charge; and a suitable slagging or fluxing material to form a liquid slag under heat, and subjecting the ore charge thus prepared to heat sufficient to cause the reactions to take place and to effect the reduction of the ore and the purification of the metal.

9. A process of manufacturing steel directly from ore which consists in providing an ore charge containing the ore in a comparatively fine state of division, an efficient cellulose carbo-hydrate reducing agent associated with sufficient water to bring the same into intimate contact with the particles of ore under treatment, a finely ground carburizing carbon in proportions adequate to effect carburization, a suitable quantity of manganese dioxid thoroughly mixed with the ore charge, and a suitable slagging or fluxing material to form under heat a liquid slag, and subjecting the ore charge thus prepared to heat sufficient to cause the reactions to take place and to effect the reduction, purification and carburization of the metal at one operation.

10. The method or process of reducing iron ores to metallic iron, which consists in preparing an ore-charge containing (a) suitable ore in a fine or a comparatively fine state of division (b) an efficient cellulose carbo-hydrate reducing agent associated with sufficient water to bring the same into intimate contact with the particles of ore under treatment (c) a suitable quantity of finely ground dioxid of manganese thoroughly mixed with the ore-charge and (d) suitable slagging or fluxing materials to form under heat, a liquid slag; and subjecting such mixture to a heat sufficient to effect the reduction of the ore and the purification of the metal, under the conditions and in the manner substantially as hereinbefore set forth.

11. The method or process of manufacturing steel directly from ore which consists in preparing an ore-charge containing (a) suitable ore in a fine or a comparatively fine state of division (b) an efficient cellulose carbo-hydrate reducing agent associated with sufficient water to bring the same into intimate contact with the particles of ore under treatment (c) a finely ground carburizing carbon in proportions adequate to effect the carburization required and a suitable quantity of manganese dioxid, both thoroughly mixed with the ore-charge and (d) suitable slagging or fluxing materials to form, under heat, a liquid slag; and subjecting such mixture to a heat sufficient to effect the reduction, purification and carburization of the metal at one operation under the conditions and in the manner substantially as hereinbefore set forth.

In testimony whereof we have hereunto set our hands in presence of two subscribing witnesses.

WILLIAM SPEIRS SIMPSON.
HOWARD OVIATT.

Witnesses:
H. D. JAMESON,
F. L. RANDS.